United States Patent
Lakshmanan et al.

(10) Patent No.: US 9,251,269 B2
(45) Date of Patent: Feb. 2, 2016

(54) ACCOUNTING FOR AUTHORSHIP IN A WEB LOG SEARCH ENGINE

(75) Inventors: Geetika T. Lakshmanan, Winchester, MA (US); Martin Oberhofer, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 13/282,887

(22) Filed: Oct. 27, 2011

(65) Prior Publication Data

US 2013/0110812 A1 May 2, 2013

(51) Int. Cl.
*G06F 17/30* (2006.01)
*G06Q 10/00* (2012.01)

(52) U.S. Cl.
CPC ...... *G06F 17/30867* (2013.01); *G06F 17/3053* (2013.01); *G06Q 10/00* (2013.01)

(58) Field of Classification Search
USPC .......................................... 707/722, 723, 728
See application file for complete search history.

(56) References Cited

U.S. PATENT DOCUMENTS

| | | | |
|---|---|---|---|
| 8,073,947 B1 * | 12/2011 | Yeh et al. | 709/224 |
| 8,166,026 B1 * | 4/2012 | Sadler | 707/725 |
| 8,606,792 B1 * | 12/2013 | Jackson et al. | 707/748 |
| 2005/0240756 A1 * | 10/2005 | Mayer | 713/2 |
| 2005/0256866 A1 | 11/2005 | Lu et al. | |
| 2008/0082491 A1 * | 4/2008 | Scofield et al. | 707/3 |
| 2008/0114709 A1 | 5/2008 | Dixon et al. | |
| 2008/0133585 A1 * | 6/2008 | Vogel et al. | 707/102 |
| 2008/0243784 A1 * | 10/2008 | Stading | 707/3 |
| 2008/0243812 A1 * | 10/2008 | Chien et al. | 707/5 |
| 2009/0037412 A1 * | 2/2009 | Bard et al. | 707/5 |
| 2009/0077056 A1 * | 3/2009 | Ravikumar et al. | 707/5 |
| 2009/0119173 A1 | 5/2009 | Parsons et al. | |
| 2009/0157490 A1 * | 6/2009 | Lawyer | 705/11 |
| 2009/0164408 A1 | 6/2009 | Grigorik et al. | |
| 2009/0165128 A1 * | 6/2009 | McNally et al. | 726/21 |
| 2009/0249451 A1 * | 10/2009 | Su et al. | 726/5 |
| 2010/0082610 A1 * | 4/2010 | Anick et al. | 707/723 |
| 2010/0153404 A1 * | 6/2010 | Ghosh et al. | 707/748 |
| 2010/0174748 A1 * | 7/2010 | Strumpf et al. | 707/780 |

(Continued)

OTHER PUBLICATIONS

Buntine, "Opportunites from Open Source Search," Proceedings of the 2005 IEEE/WIC/ACM International Conference on Web Intelligence, 2005.

(Continued)

*Primary Examiner* — Sherief Badawi
*Assistant Examiner* — Christopher J Raab
(74) *Attorney, Agent, or Firm* — Steven M. Greenberg, Esq.; CRGO Law

(57) ABSTRACT

Embodiments of the present invention provide a method, system and computer program product for authorship accountability in a blog search engine. In an embodiment of the invention, a method for authorship accountability in a blog search engine is provided. The method includes receiving a search engine query specifying both query terms to query blog content and also authorship criteria for authors of blog content in respective entries of a results set returned by the search engine query. The method additionally includes evaluating the authorship criteria for each author of corresponding blog content returned by the search engine query and computing a relevance for each entry in the results set based upon the evaluated authorship criteria. Finally, the method includes presenting in order of relevance a listing of blog content corresponding to the results set.

20 Claims, 2 Drawing Sheets

(56) References Cited

U.S. PATENT DOCUMENTS

| | | |
|---|---|---|
| 2010/0318426 A1 | 12/2010 | Grant et al. |
| 2011/0313987 A1* | 12/2011 | Ghosh et al. ............... 707/706 |
| 2012/0042020 A1* | 2/2012 | Kolari et al. ............... 709/206 |
| 2012/0110432 A1* | 5/2012 | Mei et al. ............... 715/233 |
| 2012/0117059 A1* | 5/2012 | Bailey et al. ............... 707/723 |
| 2012/0179972 A1* | 7/2012 | Hacid et al. ............... 715/738 |
| 2012/0239663 A1* | 9/2012 | Tzruya et al. ............... 707/741 |
| 2012/0259866 A1* | 10/2012 | Austin et al. ............... 707/748 |
| 2012/0310928 A1* | 12/2012 | Ray et al. ............... 707/728 |
| 2012/0330938 A1* | 12/2012 | Lee et al. ............... 707/723 |

OTHER PUBLICATIONS

Rose et al., "Understanding User Goals in Web Search," Proceedings of the 13th international conference on the World Wide Web, 2004, pp. 13-19.

Kules, "Mapping the Design Space of Faceted Search Interfaces," Workshop on Human-Computer Interaction and Information Retrieval, MIT CSAIL, Cambridge MA USA Oct. 23, 2007.

Bell, "Authority facets: Judging trust in unfamiliar content", Workshop on Human-Computer Interaction and Information Retrieval, MIT CSAIL, Cambridge MA USA Oct. 23, 2007.

* cited by examiner

ACCOUNTING FOR AUTHORSHIP IN A WEB LOG SEARCH ENGINE

BACKGROUND OF THE INVENTION

1. Field of the Invention

The present invention relates to search results characterization in a search engine and more particularly to search results characterization in a Web log ("blog") search engine.

2. Description of the Related Art

Content distribution serves a core function of the Internet. From the earliest days of Internet computing, tools such as "Archie" and "Gopher" provided content retrieval mechanisms in which content—namely academic and technical publications—could be located and retrieved, even if the identify of a retrieved publication had not been known a priori. Nearly two decades ago, with the development and commercial deployment of the World Wide Web (the "Web"), content searching tools experienced a dramatic leap forward with the development of several commercially accessible search engines specifically geared to content distributed over the Web. Even today, search engine technology for Web based content continues to evolve in ways unimaginable even just a few years ago.

In the prototypical search engine, in a process often referred to as "spidering", a computer program periodically (or today, continuously) probes Web accessible content sources—namely Web sites—parses the textually content of the content sources and incorporates the parsed content into an index. Thereafter, query terms can be received through a generic user interface (UI) and the index can be consulted to identify indexed content containing one or more of the query terms, also referred to as search terms. Finally, a result set can be presented in the UI to the querying end user. Optionally, the relevancy of each result set can be provided in the result set indicating a percentage of query terms appearing in the result set. Further, the result set can be sorted according to relevance so that the most relevant results appear at the beginning of the list for ease of access by the querying end user.

While search engine technology has formed part and parcel of the daily Internet experience for the typical end user in respect to content on the Web, the efficacy of the traditional search engine has not translated well to the "Blogosphere". The term "Blogosphere" refers to the collection of Web logs ("blogs") accessible through the Web or outside of the Web. As it is well known, a blog is essentially an open diary produced by an author expressing thoughts either amorphously, or more typically in accordance with a theme. Thus, blog postings and indeed the entirety of a blog, often is associated with one author or a collective of authors. Thus, while the content itself of a basic Web page may be the only important aspect of the Web page from the perspective of an end user searching Web content, in the Blogosphere, the content of the blog in addition to the nature of the author of the blog can be equally as important. Yet, the conventional search engine does not account for the nature of the author in performing content searching.

BRIEF SUMMARY OF THE INVENTION

Embodiments of the present invention address deficiencies of the art in respect to content searching blogs and provide a novel and non-obvious method, system and computer program product for authorship accountability in a blog search engine. In an embodiment of the invention, a method for authorship accountability in a blog search engine is provided. The method includes receiving a search engine query specifying both query terms to query blog content and also authorship criteria for authors of blog content in respective entries of a results set returned by the search engine query. The method additionally includes evaluating the authorship criteria for each author of corresponding blog content returned by the search engine query and computing a relevance for each entry in the results set based upon the evaluated authorship criteria. Finally, the method includes presenting in order of relevance a listing of blog content corresponding to the results set.

In one aspect of the embodiment, the method further can include receiving in the search engine query content criteria for the blog content in the respective entries of the results set returned by the search engine query and evaluating the content criteria for blog content returned by the search engine query before computing the relevance for each entry in the results set based both upon the evaluated authorship criteria and also the evaluated content criteria. In another aspect of the embodiment, the method additionally includes weighting with disparate weights the content criteria and the authorship criteria.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for authorship accountability in a blog search engine. In accordance with an embodiment, authorship characteristics can be accounted for in performing a search of blog content in the Blogosphere. In this regard, when querying blog content according to one or more query terms, at least one authorship criteria can be specified for the blog content, such as the trustworthiness of authors corresponding to located blog content and a degree to which the authors are deemed an authority with respect to the located blog content. Further, non-authorship, content criteria pertaining to the blog itself can be factored in the search including a number of times a blog has been viewed or the presence or absence of one or more keywords in tags for the blog content. The authorship criteria, and optionally content criteria, can be weighted according to the subjective importance to the end user initiating the search and a result set can be presented according to a relevance of each result computed based upon the authorship criteria and, optionally, the content criteria. In this way, authorship characteristics can be accounted for in searching blog content in the Blogosphere.

Figure 1:
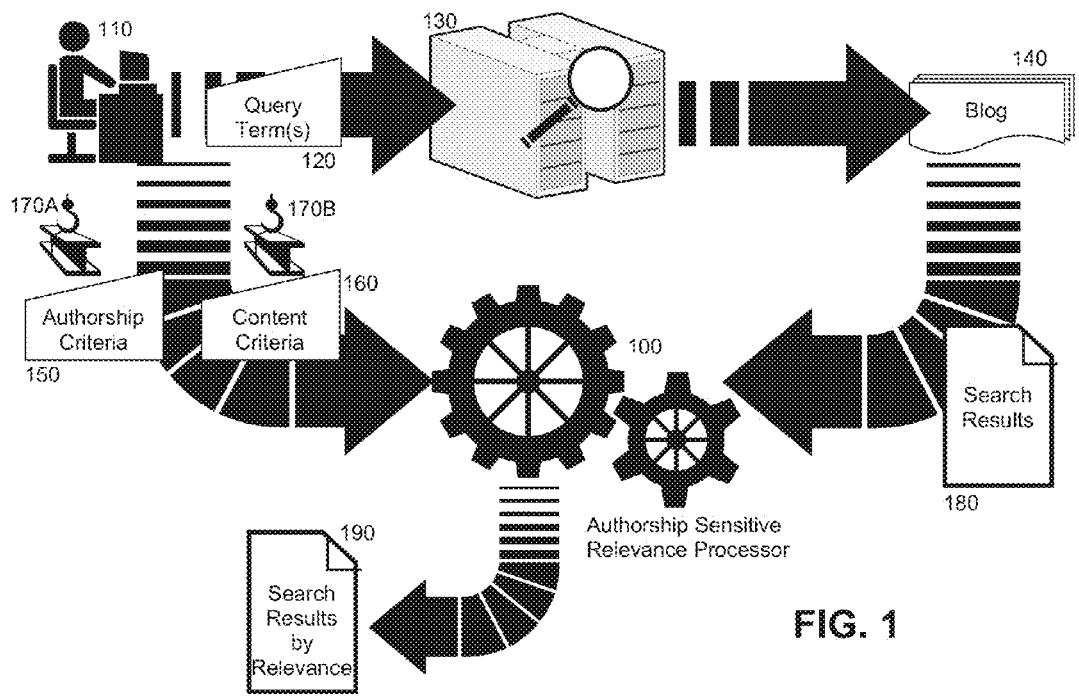
FIG. 1 is a pictorial illustration of a process for authorship accountability in a blog search engine.

In further illustration, FIG. 1 pictorially shows a process for authorship accountability in a blog search engine. As shown in FIG. 1, an end user 110 can direct a query of blog content 140 through a search engine 130 configured to search the blog content 140 according to one or more query terms. In addition to specifying one or more query terms 120 for the query, the end user 110 also can specify authorship criteria 150 to be evaluated against different authors of blog content 140 returned in a result set 180 for the query, and also content criteria 160 to be evaluated against the blog content 140 returned in the result set 180 for the query.

The authorship criteria 150 can include, for example, an indication of the degree to which a blog author of blog content 140 in a result set 180 is deemed knowledgeable, or trustworthy. Likewise, the content criteria 160 can include, for example, an indication of whether or not one or more tags have been applied to the blog content 140 in the result set 180, or an indication of a number of instances the blog content 140 in the result set 180 has been viewed. Of note, authorship sensitive relevance processor 100 can apply the authorship criteria 150 to the result set 180 in order to rearrange the result set 180 into a relevance based result set 190. Optionally, the processor 100 can consider the content criteria 160 to further compute the relevance of each result in the result set 180. To that end, different criteria 150, 160 can be associated with different weights 170A, 170B in order to weight some of the criteria 150, 160 or less than others of the criteria 150, 160.

Figure 2:
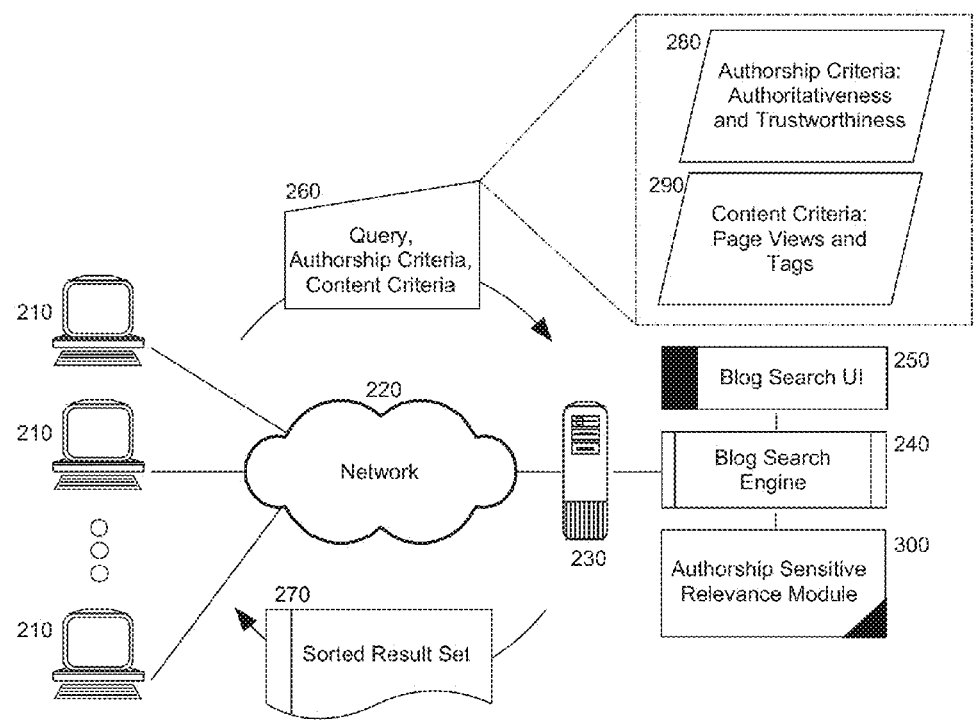
FIG. 2 is a schematic illustration of a blog search engine data processing system configured for authorship accountability in a blog search engine; and, FIG. 3 is a flow chart illustrating a process for authorship accountability in a blog search engine.

The process described in connection with FIG. 1, can be implemented in a blog search engine data processing system. In yet further illustration, FIG. 2 schematically shows a blog search engine data processing system configured for authorship accountability in a blog search engine. The system can include a host server 230 with at least one processor and memory configured for communicative coupling to different client computing devices 210 over computer communications network 220. The host server 230 can support the execution of a blog search engine 240 within the memory of the host server 230. The blog search engine 240 can be configured to process search engine queries 260 for searching blog content in the Blogosphere.

In particular, the blog search engine 240 can produce a blog search UI 250 for distribution to the different client computing devices 210 with which end users can submit queries 260 to the blog search engine 240. On note, each of the queries 260 can specify not only query terms for conducting a query of blog content, but also one or more authorship criteria 280. Optionally, one or more of the queries 260 can further specify one or more content criteria 290. The authorship criteria 280 can include, by way of example, the degree to which an author of blog content is considered authoritative and the degree to which an author of blog content is considered trustworthy.

In the former instance, authoritativeness can be computed by determining a number of times a particular author has been published, a number of times others have commented on the blog content, or a number of others whom have subscribed to blog content authored by an author. As it is well known in the art, the computation of authoritativeness can be achieved by querying an application programming interface (API) to a publication source such as a blog or online database in order to determine a number of times content has been viewed, commented upon, linked to by other Web pages, or downloaded in the case of a published downloadable document. By comparison, trustworthiness can be computed by determining whether or not an author is known to the querying end user through inclusion in a list of contacts for the end user such as buddy lists social network friends or links lists, or frequent communications exchanged by the end user with the author.

Importantly, authorship sensitive relevance module 300 can be coupled to the blog search engine 240. The authorship sensitive relevance module 300 can include program code that when executed in the memory of the host server 230 is enabled to receive through the blog search UI 250 authorship criteria for query 260, and optionally content criteria. The program code further is enabled to compute a relevance for each blog content entry returned by the blog search engine 240 responsive to the query 260 based upon the authorship criteria, and optionally the content criteria. For instance, blog content entries returned by the blog search engine 240 in which a corresponding author is determined to be either or both authoritative and trustworthy can be ranked higher than other blog content entries returned by the blog search engine 240 for the query 260. Thereafter, the program code of the module 300 can return a sorted result set 270 providing a sort order of blog content from higher to lower relevance to a querying end user.

Figure 3:
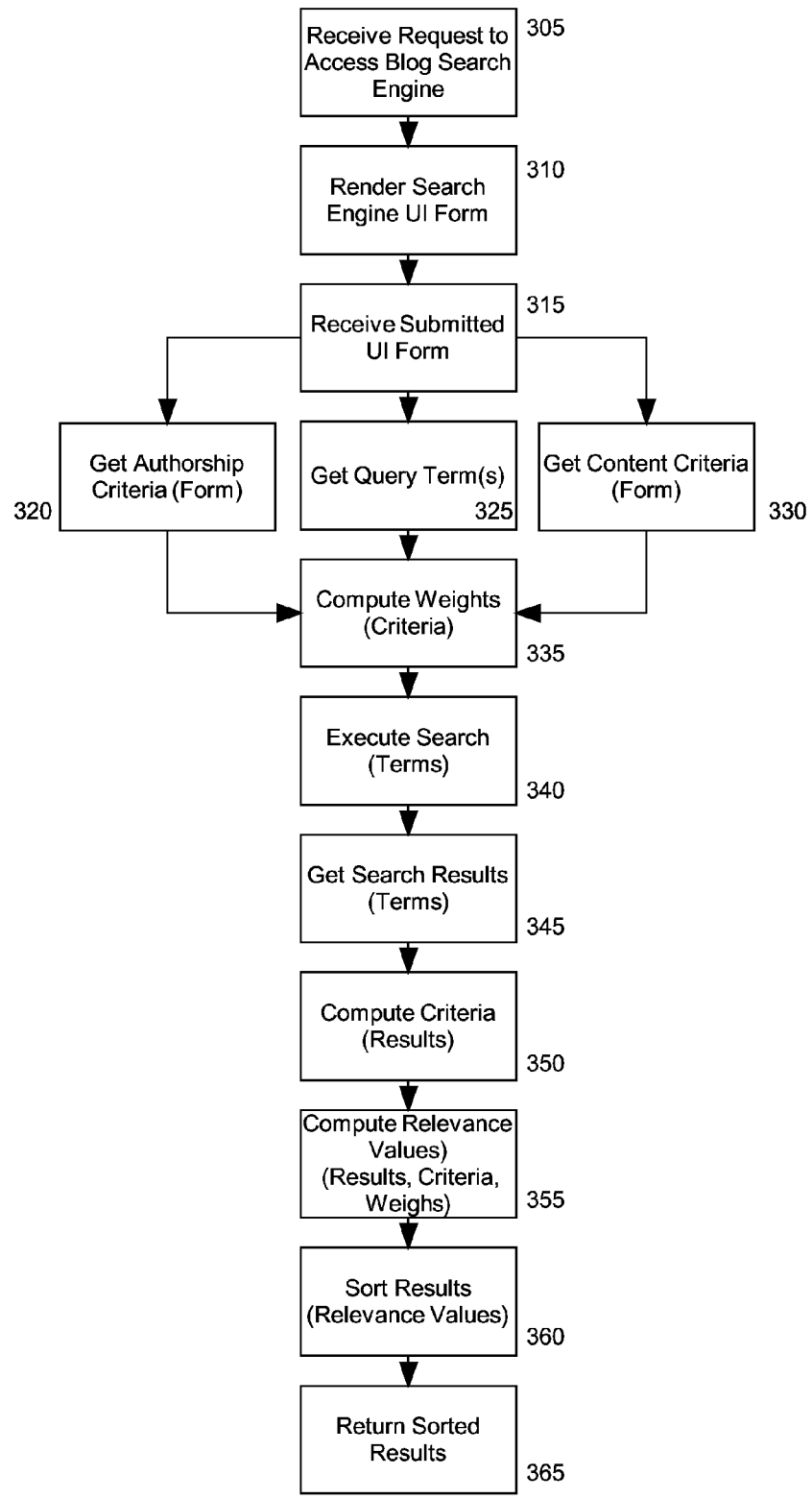

In even yet further illustration of the operation of the authorship sensitive relevance module 300, FIG. 3 is a flow chart illustrating a process for authorship accountability in a blog search engine. Beginning in block 305, a request can be received from an end user to compose a query to query blog content accessible over a computer communications network. In block 310, a search engine UI can be returned to the end user for completion with one or more query terms, authorship criteria, and optionally content criteria. In block 315, a completed form of the search engine UI can be received and in block 320, the authorship criteria can be extracted from the UI form, in block 325 one or more query terms can be extracted from the UI form, and in block 330 as an option content criteria can be extracted from the UI form.

In block 335, different weights for the different authorship and content criteria can be computed. By default, each different criteria can be weighted equally, however, in other aspects of the embodiment, the different criteria can be weighted disparately. In block 340, the query terms extracted from the UI form can be used in executing a query against blog content in the Blogosphere and in block 345, a set of search results can be returned responsive to the query, each of the search results referring to blog content. In block 350, the authorship criteria can be evaluated for each different author corresponding to each different entry in the result set. Likewise, where applicable, the content criteria can be evaluated for the blog content of each different entry in the result set. In block 355, a relevance value can be computed for each entry in the result set based upon the weighted combination of the evaluated criteria for each entry in the result set and in block 360 the entries of the result set can be sorted from entry of highest relevance to entry of lowest relevance. Finally, in block 365 the sorted result set can be returned to the querying end user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. With specific reference to a computer readable storage medium, it is to be understood that a computer readable storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for authorship accountability in a blog search engine, the method comprising:
   receiving a search engine query via a completed form by a user specifying query terms to query World Wide Web ("Web") content ("blog content"), authorship criteria for authors of blog content and also content criteria, the authorship criteria including an indication of a degree to which a blog author of blog content in a results set is deemed both authoritative and trustworthy, wherein authoritativeness is computed by determining a number of others whom have subscribed to blog content authored by an author, wherein trustworthiness is computed by at least one of determining whether the blog author is known to a querying end user through inclusion in a list of contacts for the end user and frequent communications exchanged by the end user with the blog author, and wherein the blog author is a writer of blog content;
   evaluating the authorship criteria for each blog author of corresponding blog content returned by the search engine query;
   evaluating the content criteria for the blog content returned in the results set by the search engine query;
   computing a relevance for each entry in the results set based upon the evaluated authorship criteria and also the evaluated content criteria; and,
   presenting in order of relevance a listing of blog content corresponding to the results set.

2. The method of claim 1, further comprising weighting with disparate weights the content criteria and the authorship criteria.

3. The method of claim 1, wherein the authorship criteria comprises an extent to which the blog author of corresponding blog content is deemed authoritative.

4. The method of claim 1, wherein the authorship criteria comprises an extent to which the blog author of corresponding blog content is deemed trustworthy.

5. The method of claim 1, wherein the content criteria comprises a number of page views for corresponding blog content.

6. The method of claim 1, wherein the content criteria comprises a presence of one or more keywords in tags provided in the search engine query that appear in connection with corresponding blog content.

7. The method of claim 1, wherein the content criteria comprises a absence of one or more keywords in tags provided in the search engine query that appear in connection with corresponding blog content.

8. A blog search engine data processing system comprising:
   a host server comprising memory and at least one processor and configured for coupling to different client computing devices over a computer communications network;
   a blog search engine executing in the memory of the host server and configured to query blog content according to different query terms; and, an authorship sensitive relevance module coupled to the blog search engine, the authorship sensitive relevance module comprising program code enabled upon execution in the memory of the host server to extract both authorship criteria and also content criteria from a search engine query provided in a form completed by a user specifying query terms to query World Wide Web ("Web") content ("blog content"), authorship criteria for authors of blog content, and also content criteria, to evaluate the authorship criteria for each blog author of corresponding blog content returned by the search engine query, to evaluate the content criteria for the blog content returned by the search engine query, to compute a relevance for each entry in a results set based upon the evaluated authorship criteria and also the evaluated content criteria, and to present in order of relevance a listing of blog content corresponding to the results set,
   wherein the authorship criteria includes an indication of a degree to which a blog author of blog content in the results set is deemed both authoritative and trustworthy, wherein authoritativeness is computed by determining a number of others whom have subscribed to blog content authored by the blog author, wherein trustworthiness is computed by at least one of determining whether the blog author is known to a querying end user through inclusion in a list of contacts for the end user and frequent communications exchanged by the end user with the blog author, and wherein the blog author is a writer of blog content.

9. The system of claim 8, wherein the program code of the module further weights the content criteria and the authorship criteria.

10. The system of claim 8, wherein the authorship criteria comprises an extent to which the blog author of corresponding blog content is deemed authoritative.

11. The system of claim 8, wherein the authorship criteria comprises an extent to which the blog author of corresponding blog content is deemed trustworthy.

12. The system of claim 8, wherein the content criteria comprises a number of page views for corresponding blog content.

13. The system of claim 8, wherein the content criteria comprises a presence of one or more keywords in tags provided in the search engine query that appear in connection with corresponding blog content.

14. The system of claim 8, wherein the content criteria comprises a absence of one or more keywords in tags provided in the search engine query that appear in connection with corresponding blog content.

15. A computer program product for authorship accountability in a blog search engine, the computer program product comprising:
   a computer readable storage medium having computer readable program code embodied therewith, the computer readable program code comprising:
   computer readable program code for receiving a search engine query via a completed form by a user specifying query terms to query World Wide Web ("Web") content ("blog content"), authorship criteria for authors of blog content and also content criteria, the authorship criteria including an indication of a degree to which a blog author of blog content in a results set is deemed both authoritative and trustworthy, wherein authoritativeness is computed by determining a number of others whom have subscribed to blog content authored by an author, wherein trustworthiness is computed by at least one of determining whether the blog author is known to a querying end user through inclusion in a list of contacts for the end user and frequent communications exchanged by the end user with the author, and wherein the blog author is a writer of blog content;
   computer readable program code for evaluating the authorship criteria for each blog author of corresponding blog content returned by the search engine query;

computer readable program code for evaluating the content criteria for the blog content returned in the results set by the search engine query;

computer readable program code for computing a relevance for each entry in the results set based upon the evaluated authorship criteria and also the evaluated content criteria; and, computer readable program code for presenting in order of relevance a listing of blog content corresponding to the results set.

16. The computer program product of claim 15, further comprising computer readable program code for weighting with disparate weights the content criteria and the authorship criteria.

17. The computer program product of claim 15, wherein the authorship criteria comprises an extent to which the blog author of corresponding blog content is deemed authoritative.

18. The computer program product of claim 17, wherein the blog author of corresponding content is deemed authoritative according to a number of times the content has been viewed.

19. The computer program product of claim 17, wherein the blog author of corresponding content is deemed authoritative according to a number of times the content has been downloaded.

20. The computer program product of claim 17, wherein the blog author of corresponding content is deemed authoritative according to a number of times the content has been linked to by different Web pages.

* * * * *